United States Patent [19]

Rychlewski et al.

[11] 3,760,126

[45] Sept. 18, 1973

[54] ELECTRET PHONOGRAPH PICKUP

[75] Inventors: Thaddeus V. Rychlewski, Seneca Falls, N.Y.; Abdulgafoor M. Serang, Acton, Mass

[73] Assignee: GTE Sylvania Incorporated, Seneca Falls, N.Y.

[22] Filed: Apr. 17, 1972

[21] Appl. No.: 244,446

[52] U.S. Cl. .............. 179/100.41 B, 179/100.41 K, 179/111 E

[51] Int. Cl. .............. H04r 23/00

[58] Field of Search .......... 179/100.41 G, 100.41 B, 179/100.41 K, 111 E; 307/88 E; 178/6, DIG. 10

[56] References Cited

UNITED STATES PATENTS

| | | | |
|---|---|---|---|
| 1,804,364 | 5/1931 | Parker | 179/100.41 G |
| 3,118,022 | 1/1964 | Sessler et al. | 179/111 E |
| 3,005,060 | 10/1961 | Weathers | 179/100.41 K |
| 3,142,729 | 7/1964 | Davis | 179/100.41 K |
| 3,649,775 | 3/1972 | Kawakami | 179/100.41 K |
| 2,114,471 | 4/1938 | Keller et al. | 179/100.41 K |
| 2,436,946 | 3/1948 | Tatro | 179/100.41 G |

*Primary Examiner*—Raymond F. Cardillo, Jr.
*Attorney*—Norman J. O'Malley et al.

[57] ABSTRACT

An efficient kinetoelectric transducer is provided for use in a phonograph playback system. The transducer is positioned in the forward end portion of the pickup arm and includes a first electrode, an electret member oriented contiguous to the first electrode, and a second electrode juxtapositionally oriented relative to the side of the electret opposite that of the first electrode. The second electrode, which has a stylus support means attached thereto, is oriented to facilitate a degree of controlled vibratory movement relative to the electret member. A holding means retains the electrodes and intermediate electret member to effect a unitized transducer structure from which the stylus support member protrudes.

4 Claims, 6 Drawing Figures

ELECTRET PHONOGRAPH PICKUP

BACKGROUND OF THE INVENTION

This invention relates to phonograph pickup devices and more particularly to a type of phonograph transducer utilized therein.

In conventional phonograph playback systems, the reproducing pickup devices, conjunctive with the turntable portion thereof, employ various types of transducer cartridges, as for example, magnetic, ceramic crystal and capacitive units. The cartridge head is normally mounted at the forward end of a pivoted pickup arm and incorporates a directly connected micro-sharp needle or stylus which is oriented in a manner to make contact with the surface of a record disc positioned on a rotatable turntable therebeneath. The record to-be-played has a lengthy and finely laid spiral groove, cut therein during recording, to effect a multitude of microscopic curvatures or waves which form a physical contour of the recorded sound. During replay, the stylus of the transducer is lowered to make discrete riding contact with the moving contoured groove in the revolving record, and transmits the minute vibrations therefrom to the transducer unit. The rapid vibratory stylus movements thus conveyed to the transducer are coverted into electrical impulses therein. These signal forms are thence applied to one or more amplifying units, wherefrom the output is channelled to associated speaker reproducers to recreate an audible rendition of the recorded sounds.

The transducer is one of the several components in the phonoplayback system which determines the degree of fidelity and breadth of frequency response in the sound output of the system. When an exceptionally good response is available, such as that afforded by a magnetic pickup unit, the cost of the transducer cartridge is expensive. Likewise, when an inexpensive pickup unit, such as a crystal cartridge, is utilized, the fidelity response often leaves much to be desired. Furthermore, ceramic elements are fragile and are sometimes broken or cracked during assembling of the pickup device. This occurrence of rejects during assembly increases the overall manufacturing costs of the item.

OBJECTS AND SUMMARY OF THE INVENTION

It is an object of the invention to reduce the aforementioned disadvantages and to provide a compact, efficient and inexpensive transducer for phonograph pickup utilization. Another object is to provide a phonograph transducer that can be expeditiously fabricated.

The foregoing objects are achieved in one aspect of the invention by the provision of a relatively inexpensive and efficient kinetoelectric transducer for use in a phonograph pickup arm. The transducer includes at least one first electrode with an electret member oriented contiguous thereto. At least one second electrode is placed in a juxtapositional manner relative to the electret member on the side thereof opposite the first electrode. The second electrode, which has stylus support means attached thereto, is positioned to permit a degree of controlled vibratory movement relative to the electret member. A holding means is formed to retain and position the first and second electrode means and the intermediate electret member, thereby effecting a compact unitized strucutre with the stylus support means protruding therefrom.

DESCRIPTION OF THE PREFERRED EMBODIMENT

For a better understanding of the present invention, together with other and further objects, advantages and capabilities thereof, reference is made to the following specification and appended claims in connection with the aforedescribed drawings.

The nomenclative terminology "kinetoelectric transducer" as referenced herein is intended to be definitive of a vibration sensitive device wherein the kinetic energy resultant from vibratory motion is translated into electrical impulse signals. In this instance, the energy conversion unit is in the form of an electret to be later described. The concept of the present invention is germane to both monaural and stereophonic phonograph pickup applications.

Figure 1:
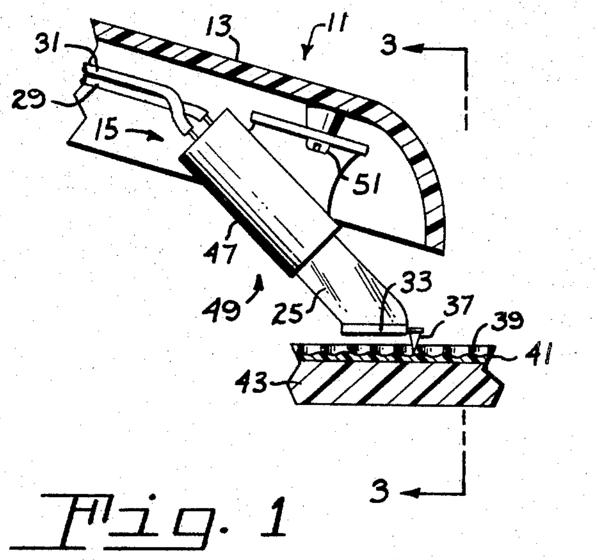
FIG. 1 is a partial cut-away elevational view of the pickup arm illustrating the positioning of one embodiment of the invention.

With reference to the drawings, there is shown in FIG. 1 a parital cut-away elevational view of a phonograph pickup tone arm member 11 whereof the forward extremital portion 13 has mounted therein one embodiment of a kinetoelectric transducer 15 that is adapted to substantially monaural utilization. The opposed supportive extremital portion, not shown, of the tone arm member 11 has pivotal means associated therewith to facilitate predetermined lateral and vertical swivel movement of the arm member. Also, associated with the supportive extremital portion of arm member 11 are conventional arm counterbalancing means, not shown. This compensating means provides for adjustable balancing of the weight of the tone arm, which in turn provides regulation of stylus pressure exerted on the moving groove of the record being sensed.

Figure 3:
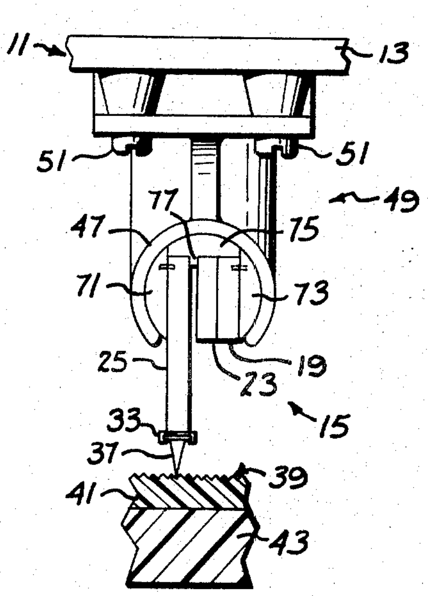
FIG. 3 is an end view illustrating constructional aspects of the invention taken along the line 3—3 of FIG. 1.
Figures 2, 4:
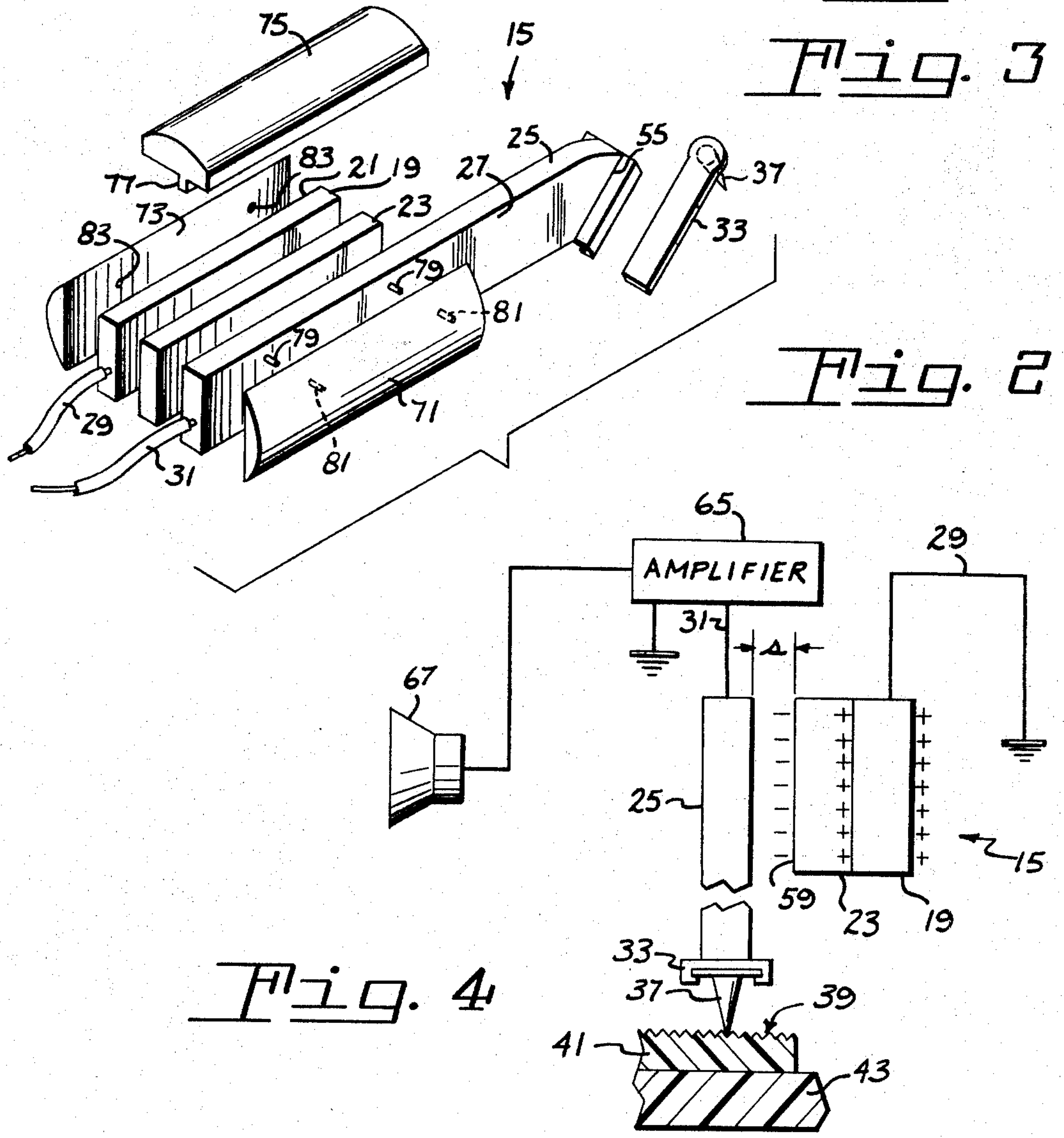
FIG. 2 is an enlarged exploded view showing the elements of one embodiment of the invention.
FIG. 4 is a diagrammatic portrayal delineating operational aspects of the invention.

In referring to FIGS. 1, 2, and 3, the kinetoelectric transducer cartridge 15 is comprised of at least one first electrode means 19 formed of electrical conductive material, at least one electret member 23, oriented contiguous to the first electrode means 19, and at least one second electrode means 25 which is juxtapositionally oriented relative to the electret member on the side thereof opposite that related to the first electrode means. While the second electrode is adjacent the electret surface, it has freedom for controlled vibratory movement relative thereto. The first and second electrode means, 19 and 25, each have separate respective provisions, 29 and 31, for effecting individual external electrical connections. A stylus support means 33 is attached to the second electrode means 25, and a groove-following needle or stylus member 37 is suitably affixed to the stylus support means to provide a vibratory sensing element positioned in a projecting manner to follow the grooving 39 cut into the surface of the partially shown phonograph record 41. The rotatable turntable 43, a portion of which is illustrated, is positioned relative to the pickup arm 11 in a manner that the record 41 placed thereon, is oriented to provide proper tracking of the stylus 37 in the record grooving 39. Transducer holding means 47 is substantially a clamping arrangement formed of plastic or metal to retain and position the respective first and second electrode means, 19 and 25, and the intermediate electret member 23 as a unitized transducer structure or cartridge 49. The holding means has provisions such as holes or ears, to accommodate attachment to the tone arm 11, as by screw affixation means 51.

In greater detail, the kinetoelectric transducer 15 of the invention is fabricated of first and second electrode means and a related electret member 23 that are of substantially planar constructions. The first electrode 19 and the electret member have conjunctive surfaces that are of substantially similar areas. The second electrode 25 has a surface area that at least equals that of the adjacent electret surface. In the embodiment shown in FIGS. 1, 2, and 3, the second electrode means 25 is larger than the electret member 23, extending forward to provide an edge oriented portion 55 whereupon the stylus support means 33 is affixed.

The substantially planar electret member 23 of the transducer 15 is a substantially permanently electrified dielectric material that has been subjected to an electrostatic field of sufficient intensity to produce a residual internal polarization that remains after the electrostatic field is removed. The treated material exhibits electrical charges of opposite sign on the opposite faces of the member. The electrostatic polarization is not merely a surface charge manifestation but extends within the mass of the material and, being thus protected from ionic disturbance, furnishes the necessary charge potential to function as a transducer. As shown in FIG. 4, the electret member 23 evidenses a substantially permanent homocharge which is manifest by positive and negative polarization on its opposite faces 59 and 61 respectively. The permanent charge is imposed in the electret base material, prior to its utilization in the transducer, by a discrete procedure which involves heating the substance and applying a strong electric field thereto. Since the first electrode 19 is contiguous to the surface 61 of the electret, being preferably bonded thereto, it has the same charge as that of the adjoining electret face. In usage, the spacing *s* between the second electrode 25 and the electret surface 59 is varied by the vibratory movement of the associated stylus 37 which senses the variations of the record grooving 39 moving therebeneath. This variance of spacing *s* produces a fluctuating electric field thereacross which induces an electric current that is directly related to the initiatory vibrations. The output signals thereby produced are applied to the input of at least one amplifier 65 which has matched speaker means 67 connected thereto.

In referring to FIGS. 2 and 3, the unitized transducer cartridge 49, in addition to those elements described, also includes a pair of insulative support members 71 and 73 of plastic or elastomer substances which exhibit a degree of resiliency. Bridging the support members and covering one side of the transducer package 15 is an insulative resilient shielding member 75, which may be of a material similar to that of the associated support members 71 and 73. The cooperation of the resilient shielding and support members substantially effects both electrical and vibrational isolation of the transducer from the holding means 47. In addition, the shielding member 75 has a longitudinally projecting rib 77 which functions as a narrow edge-oriented spacer between the second electrode means 25 and the electret member 23, and as such determines the basic spacing *s*. In the described embodiment, the support members 71, 73 and the shielding member 75 insulate the transducer cartridge 15 from the holding means and are exteriorly shaped to conform to the quasi-cylindrical shaping of the clamping transducer holding means 47, which has an open side as shown in FIG. 3. To insure infallible unitization of the transducer package, the second electrode means 25 has a plurality of small stub-like pins 79 projecting from the outer surface 27 thereof which mate with compatible holes or bores 81 in the adjoining surface of support member 71. In a similar manner, the first electrode means 19 also has a plurality of like pins, not shown, projecting from the outer surface 21 thereof to mate with holes 83 in the adjoining surface of support members 73. Thus, the several side-related componental elements comprising the pickup cartridge are efficaciously retained in the unitized transducer structure 49.

While the drawings tend to exaggerate the size of the transducer structure, the pickup cartridge per se lends itself to a small, lightweight compaction. For example, the planar electret member 23 is formed of a relatively thin layer of one or more known electret forming materials, such as carnauba wax and resin mixtures, cellulose acetate, polyvinylidine chloride, and polyethylene terephthalate, to name a few. For instance, polyethylene terephthalate tape material which is commercially known as "Mylar" and available from DuPont, Wilmington, Delaware, is applicable to this usage in a thickness range of substantially 1 to 10 mils. Metal foil contiguously applied to one side of the formed electret member 23 provides the first electrode means 19. The second electrode means 25 is, for example, a sheet of substantially stiff thin metal, such as aluminum or brass of from 3 to 10 mils thickness.

Figure 5:
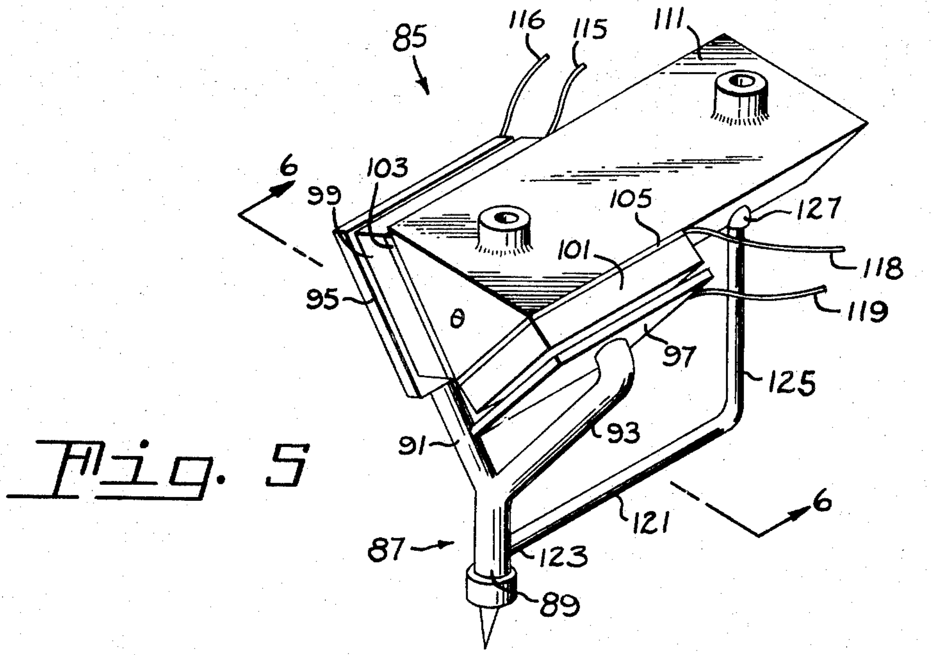
FIG. 5 is a perspective view of another embodiment of the invention.
Figure 6:
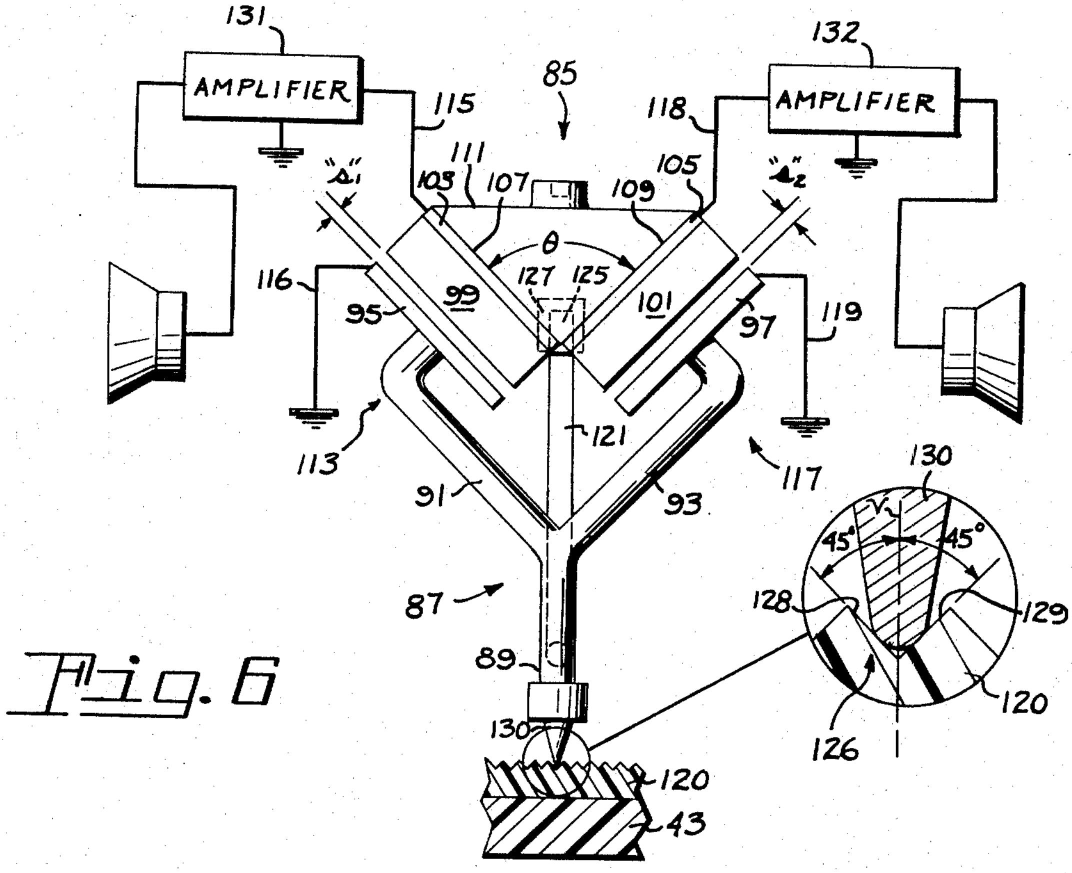
FIG. 6 is an enlarged view of substantially the end portion taken along the line 6—6 of FIG. 5.

In referring to FIGS. 5 and 6, there is shown another embodiment of the invention wherein a stereophonic kinetoelectric transducer cartridge 85 is detailed. By way of example, a two channel cartridge is illustrated and described. The stylus support means is shaped as a substantially Y-shaped member 87 having a shank 89 and dual arms 91 and 93. Each of the arms has an individual substantially planar second electrode means 95, 97 attached thereto. Separate planar electret members 99 and 101 are positioned spacially adjacent each of the aforementioned second electrode means. Each of the electret members has a separate first electrode means 103 and 105 contiguously associated therewith, whereof each electret-first electrode combination is attached to a separate facing 107 and 109 of the transducer holding means 111, the facings being of substantially triangular prismatic orientation of substantially 90° angular separtion $<\theta$. Thus, the stereophonic cartridge 85 includes a first transducer 113 comprising a first electrode means 103, an associated electret 99, and a spatially related second electrode means 95. The first and second electrodes have separate provisions 115 and 116 for effecting the respective external electrical connections for the first transducer 113. In like manner, a second transducer 117 comprises a first electrode 105, an associated electret 101, and a related second electrode 97. Separate external electrical connections 118 and 119 respectively are also provided.

To maintain a basic spacing $s_1$ and $s_2$ between the respective second electrode 95, 97 and the respective electret 99, 101 in the respective first and second related transducers 113 and 117, an elongated resilient stylus support brace member 121 is employed. This brace member has a forward end 123 attached to the shank 89 of the Y-shaped stylus support means 87. The opposite or posterior end 125 of the brace member is set in a resilient dampner bushing 127 which is seated in the body of the transducer holding means 111 to minimize the transfer of vibrations of the sytlus support member through the brace member to the transducer holding means.

For the operational aspects of the two-channel kinetoelectric cartridge 85 reference is made to FIG. 6 in particular. In the 45/45 system of stereophonic recording, the cutting needle moves up and down along two axes, each of which is tilted 45 degrees from the vertical $v$ of the grooving in the record 120. Such cutting motion contours one sound track into the first wall 128 of the groove 126 and another sound track into the opposite or second wall 129 of the groove. Thus, as the transducer cartridge stylus 130, which is affixed to the shank 89 of the "Y" shaped stylus support means 87, moves along the dually contoured record grooving 126, the resultant vibratory motion causes a fluctutation in spacings $s_1$ and $s_2$ in the respective first and second transducers 113 and 117. The two related electrical outputs resultant therefrom are thence applied to at least two individual amplifiers and speaker combinations 131, 132 to effect an integrated audio reproduction.

Thus, there is provided a compact, efficient and inexpensive electret phonograph pickup transducer that can be expeditiously fabricated.

While there has been shown and described what are at present cnnsidered the preferred embodiments of the invention, it will be obvious to those skilled in the art that various changes and modifications may be made therein without departing from the scope of the invention as defined by the appended claims.

What is claimed is:

1. A kinetoelectric transducer for use in a phonograph pick-up arm having a free forward end and an opposed supportive end, said transducer comprising:
at least one longitudinal planar first electrode means;
at least one longitudinal planar electret member oriented contiguous to said first electrode means;
at least one longitudinal planar second electrode means juxtapositionally oriented relative to said electret member on the side thereof opposite said first electrode means, and having a surface area at least equalling that of the electret adjacent thereto, said second electrode means having freedom for controlled vibratory movement relative to said electret member; said first and second electrode means each having separate provisions for effecting individual external electrical connections;
stylus support means attached to said second electrode means; and
holding means of quasi-cylindrical shaping formed to retain and position said respective first and second longitudinal electrode means and said intermediate electret member as a unitized structure, said holding means having an open side to permit a portion of said second electrode and said stylus support means oriented forwardly thereon to protrude from said holding means, said holding means having provisions for attachment to said pick-up arm.

2. A kinetoelectric transducer according to claim 1 wherein said stylus support means is affixed to a substantially edge oriented portion of said second longitudinal electrode means.

3. A kinetoelectric transducer according to claim 1 wherein said holding means is a quasi-cylindrical shaped clamping arrangement including a pair of longitudinal resilient insulative support members individually oriented relative to the outer sides of said first and second electrode means to effect a unitized structure.

4. A kinetoelectric transducer according to claim 3 wherein said first and said second electrode members each have a plurality of discrete pins projecting from one side thereof to mate with compatible bores in the adjoining surfaces of the respective support members to facilitate unitization of said transducer.

* * * * *